United States Patent [19]

Holter et al.

[11] Patent Number: 4,731,859
[45] Date of Patent: Mar. 15, 1988

[54] MULTISPECTRAL/SPATIAL PATTERN RECOGNITION SYSTEM

[75] Inventors: Marvin J. Holter; David Zuk, both of Ann Arbor; Vernon Larrowe, Ypsilanti; Robert J. Maxwell, Ann Arbor, all of Mich.

[73] Assignee: Environmental Research Institute of Michigan, Ann Arbor, Mich.

[21] Appl. No.: 778,315

[22] Filed: Sep. 20, 1985

[51] Int. Cl.$^4$ ............................................. G06K 9/00
[52] U.S. Cl. ........................................ 382/36; 382/31
[58] Field of Search ...................... 382/31, 36, 37, 38, 382/39, 6, 17

[56] References Cited

U.S. PATENT DOCUMENTS

| | | | |
|---|---|---|---|
| 3,315,229 | 4/1967 | Smithline | 382/17 |
| 3,745,527 | 7/1973 | Yoshimura | 382/17 |
| 4,097,845 | 6/1978 | Bacus | 382/37 |
| 4,115,761 | 9/1978 | Ueda et al. | 382/37 |
| 4,307,376 | 12/1981 | Miller et al. | 382/36 |

Primary Examiner—Leo H. Boudreau
Attorney, Agent, or Firm—Krass and Young

[57] ABSTRACT

A pattern recognition system for use with a two-dimensional image, each point associated with a height and with contributions from various wavelengths of light. The image to be analyzed is first sensed by a sensor and stored in a memory. Signals, read from the memory, are filtered and processed to produce signals measuring each of the wavelengths and measuring the height. The resulting distributions of data are first scanned for areas containing appropriate height measurements. Each pixel of these areas is classified according to predetermined classification definitions, further reducing the areas to be processed. These areas are subjected to spatial classification according to other classification definitions. The spatial classification may be accomplished by a neighborhood processor. The areas of the image are then identified with the features to be recognized.

18 Claims, 9 Drawing Figures

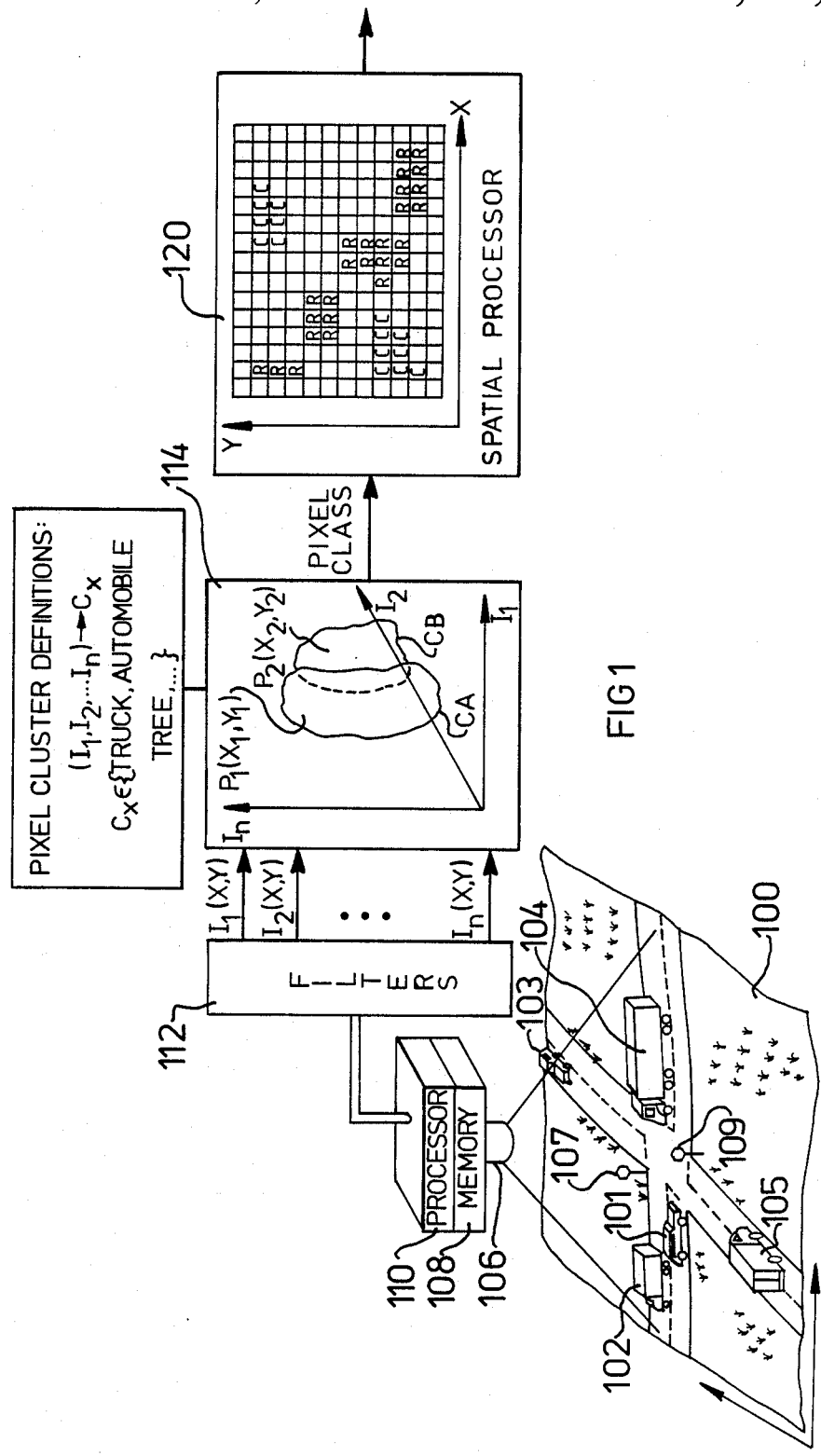

PIXEL CLASSIFICATION

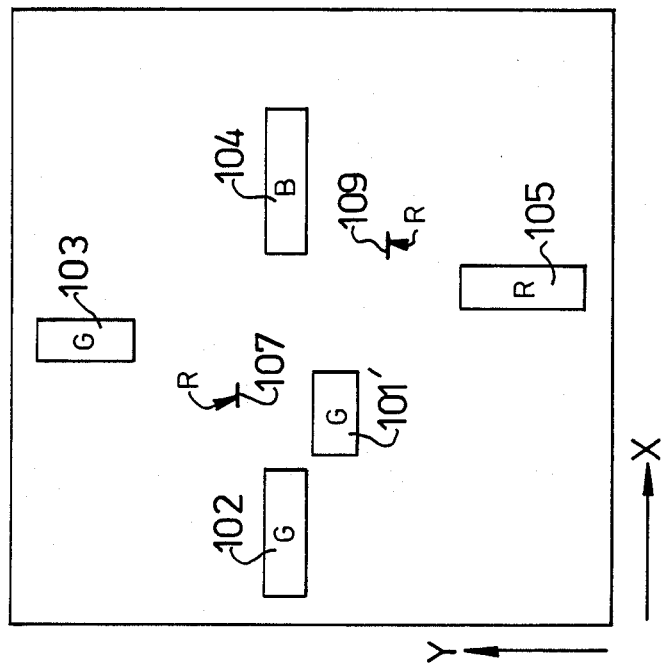
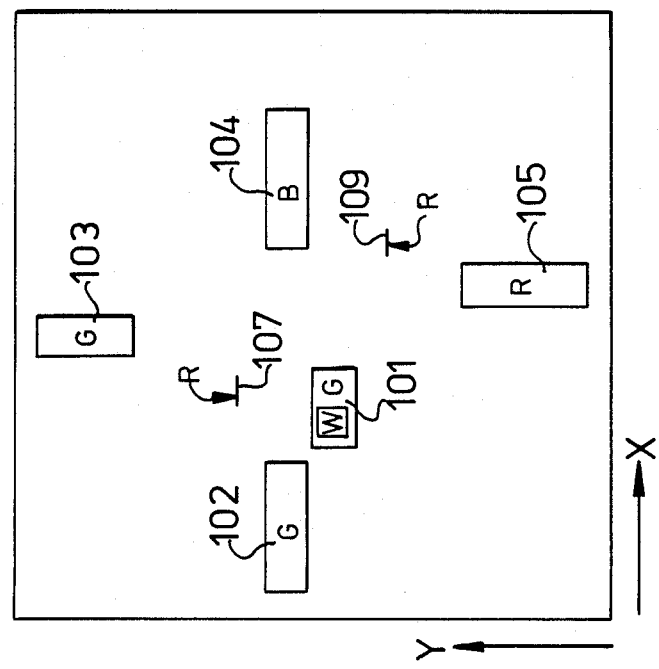

MULTISPECTRAL/SPATIAL PATTERN RECOGNITION SYSTEM

DESCRIPTION

1. Field of the Invention

This invention relates generally to a method and apparatus for performing pattern recognition and more particularly to a method and apparatus for performing pattern recognition on multispectral data based on spectral classification and spatial analysis.

2. Background of the Invention

Pattern recognition systems, especially those which accomplish machine vision tasks, are becoming commonly used in commercial and industrial applications. Machine vision systems lie at the heart of robotic welding and assembly systems and product inspection systems, including those for printed circuit board or integrated circuit inspection. Pattern recognition systems also find use in terrestrial imaging applications such as land form analysis, crop growth and disease studies, and ice pack monitoring.

Pattern recognition is most commonly performed on images produced in some form of electromagnetic energy, such as microwave or light energy. However, pattern recognition principles can also be applied to images created in acoustic energy. The image data may be obtained by passive means or by active means (for example, by flooding the scene of interest with light of a known spectral content and observing the reflected light).

The image may be two- or three-dimensional. When the points having similar spectral responses are considered collectively they form two-dimensional spatial patterns. However, besides the spectral response associated with each point in the field of view, each point may also have an associated third spatial dimension, such as a height.

In an alternative approach to the pattern recognition problem, the image may be presented as a distribution of data, possibly stored in a memory device, encoded to contain all of the information referred to above, such as the two- or three-dimensional spatial information and the image's spectral components.

The recognition of patterns can be based on the spectral components of the image, the two- or three-dimensional spatial configuration of the image, or some combination of these. It is known, for example, how to classify points in a Landsat image based on the spectral response obtained from each point. Solutions to the more difficult tasks of classifying two- or three-dimensional spatial configurations are also known in the prior art. Spatial classification analysis is more difficult than spectral classification because the neighbors to each point must be considered as well as the point itself and the features of interest usually occupy only a small fraction of the total field of view. Particularly suitable for the analysis of spatial configurations is a serial neighborhood processing system, whose details are disclosed in U.S. Pat. Nos. 4,167,728, 4,322,716 and 4,395,698 which are hereby incorporated by reference. These patents are each assigned to the Environmental Research Institute of Michigan, the assignee of the present invention.

There is a method for performing some classifications based on both spectral response and spatial configurations known in the prior art. It was reported by J. N. Gupta and P. A. Wintz in "A Boundary Finding Algorithm and its Application," IEEE Transactions on Circuits and System, Vol. CAS-22, No. 4, April 1975. The method comprises, for each wavelength component of the spectral response, performing a spatial analysis to define boundaries between disimilar regions and superimposing the resulting sets of boundaries which divide the field of view into a large number of small areas. Each of these small areas is then classified according to its spectral response. Because the image derived from each spectral component is subjected to an analysis of the spatial configurations it contains, this can be an inefficient procedure.

It is, therefore, desirable to find an alternative means for performing pattern recognition analysis on multispectral data which does not require that the spatial distribution of data at each wavelength be analyzed separately. It is further desirable to find a method and apparatus which can improve the efficiency of a multispectral pattern recognition task by performing the most restrictive operation on the image first, in order to minimize the amount of data which must be handled by subsequent operations.

BRIEF DESCRIPTION OF THE INVENTION

This invention overcomes the demanding computational task of separately analyzing the spatial distribution of data at each wavelength at which data are collected. It also improves the efficiency of the multispectral pattern recognition task by performing spectral classification and spatial distribution tasks in a preferred order. This accomplishes pattern recognition tasks not possible using only spectral or spatial information alone.

According to one aspect of the invention, a method is provided for recognizing features in a two-dimensional distribution of data points, each data point in the distribution being associated with measured intensities of radiated energy at a plurality of wavelengths. It has a spatial classification step of receiving the designation of a first subset of the two-dimensional distribution of data points and determining those areas in the designated first subset meeting the requirements of a class having preselected spatial configurations exhibited by any of the first subset data points and its surrounding data points. The method also has an energy intensity classification step of receiving the designation of a second subset of the two-dimensional distribution of data points and the plurality of measured intensities of radiated energy associated with each of the data points in the second subset and determining those areas in the designated second subset containing data points whose associated measured intensities of radiated energy conform to the requirements of a class having preselected measured intensities. Finally, the method designates areas of the two-dimensional distribution to one of the classification steps, designates the areas determined by the one of the classification steps to the other of the classification steps, and receives the determination of the areas by the other classification step.

According to a second aspect of the invention, an apparatus is provided for recognizing features in a two-dimensional distribution of data points, each data point in the distribution being associated with measured intensities of radiated energy at a plurality of wavelengths. The apparatus comprises first classification means for receiving the designation of a first subset of the two-dimensional distribution of data points and for determining those areas in the designated first subset meeting the requirements of a class having preselected spatial configurations exhibited by any of the first subset data points and its surrounding data points. It also comprises a second classification means for receiving the designations of a second subset of the two-dimensional distribution of data points and the plurality of measured intensities of radiated energy associated with each of the data points in the second subset and for determining those areas in the designated second subset containing data points whose associated measured intensities of radiated energy conform to the requirements of a class having preselected measured intensities. Finally, the apparatus comprises means for designating areas of the two-dimensional distribution to one of the classification means, for designating the areas determined by the one of the classification means to the other of the classification means, for receiving the determination of the areas by the other classification means, and for identifying the data points containing the features to be recognized. When using this technique on multispectral data, the area of the scenes to be spatially analyzed is greatly reduced. The pattern recognition task is, therefore, accomplished with greatly reduced computational requirements.

The spatial classification step can operate on two-or three-dimensional images or simply a single component of the image, such as the height dimension. The spatial processing can be done by a neighborhood processing system when the field of view is broken into picture elements (pixels) for use by the neighborhood processing system.

BRIEF DESCRIPTION OF THE DRAWINGS

FIG. 1 of the drawings is a schematic diagram of the pattern recognition system of the present invention;

FIG. 5 illustrates the image resulting from applying the pixel classifier to the image in FIG. 3;

FIG. 6 illustrates the image resulting from the "filling-in" operation of the spatial classifier of the present invention;

DETAILED DESCRIPTION OF THE PREFERRED EMBODIMENT

Figure 3:
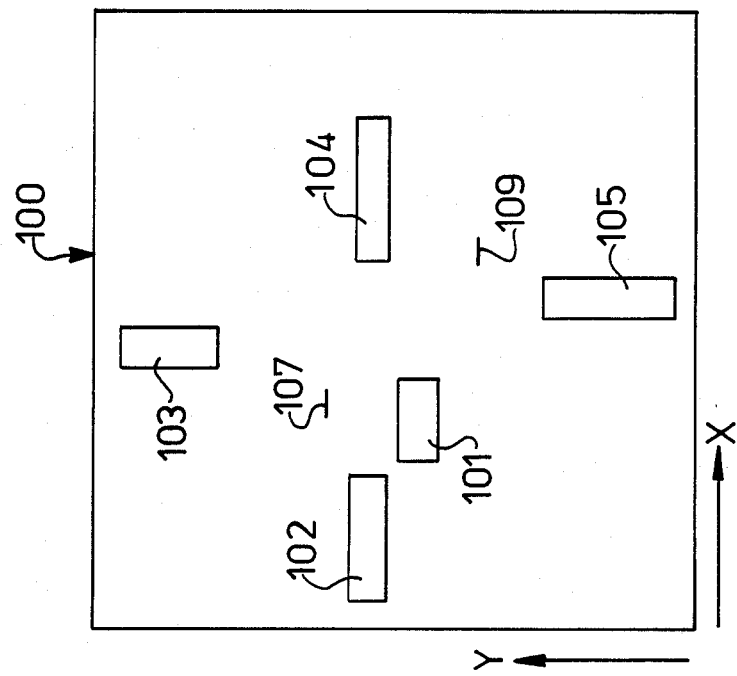
FIG. 3 illustrates the image resulting after scanning the image for abrupt height changes.

Referring now to the figures of the drawings, a greater appreciation of the invention may be gained. A scene to be analyzed, such as a view of scene 100 as seen from an airplane flying overhead, is imaged by a imaging device 106. Imaging device 106 which scans the scene 100 according to a fixed pattern may be capable of obtaining multispectral data simultaneously, or may consist of a collection of imaging devices, each operating independently, and perhaps sequentially. Further, the imaging device 106 may be able to collect some aspects of the images passively, such as the colors of the objects on the ground, and it may also be able to make active measurements, such as the vertical separation of the objects in the scene from the airplane. Thus, the imaging device can include both a sensing device and processing means for making the necessary measurements.

Scene 100 may generally include topography having varying altitudes, with objects of interest, say motor vehicles 101–105, of differing models and colors, placed on the surface of the land. The motor vehicles may be distinguished from the landscape by the fact that they represent discontinuous changes in the altitude of scene 100, the contours of these discontinuities having particular shapes as seen from above.

The description of the preferred embodiment will be given in the context of recognizing a green automobile with a white top in the scene and from all other vehicles which may be present in scene 100.

Imaging device 106 produces an image of scene 100 which may be stored in a digital memory 108, one picture element (pixel) after another. The data stored concerning each pixel depends upon the characteristics of imaging device 106, but may comprise various aspects of the color of the pixel such as its hue and intensity. The data may also include the altitude of the object contained in each pixel.

A first step in the pattern recognition task, a partial classification performed by processor 110, is to distinguish "abrupt" changes in altitude from those which are less abrupt. It is a partial classification in that pixels which exhibit such an abrupt change in altitude do not necessarily constitute the automobile being sought. This step is performed on the altitude data using the techniques of mathematical morphology as discussed in the book "Image Analysis and Mathematical Morphology," by J. Serra, Academic Press, 1982. One particularly useful method is the "rolling ball" transformation, described by S. Sternberg in "Cellular Computer and Biomedical Image Processing," Bio-Mathematics, Springer-Verlag, 1980. The result of this transformation will be data associated with each pixel which describes the altitude of pixels relative to a "flattened" ground.

Performing this step on the third dimension (height) first is useful in this particular application because such abrupt changes are relatively unusual, and, after this step, a relatively small fraction of the total image is all that must be further considered. The determination of whether to perform this step first can be decided on past experiences with data of the particular type being viewed. In other applications, this altitude discrimination may not be the best first classification step.

Having first been scanned for abrupt changes in height by processor 110, the multispectral image data, stored in memory 108, are analyzed one pixel at a time according to a systematic procedure. For each pixel in the areas having abrupt height changes, the intensity at each wavelength is separated from all others by being transmitted by processor 110, to a means, such as filter bank 112, which creates a set of parallel signals ($I_1(x,y)$ ..., $I_n(x,y)$) associated with this pixel. This set of signals is sent to pixel classifier 114.

Figure 2:
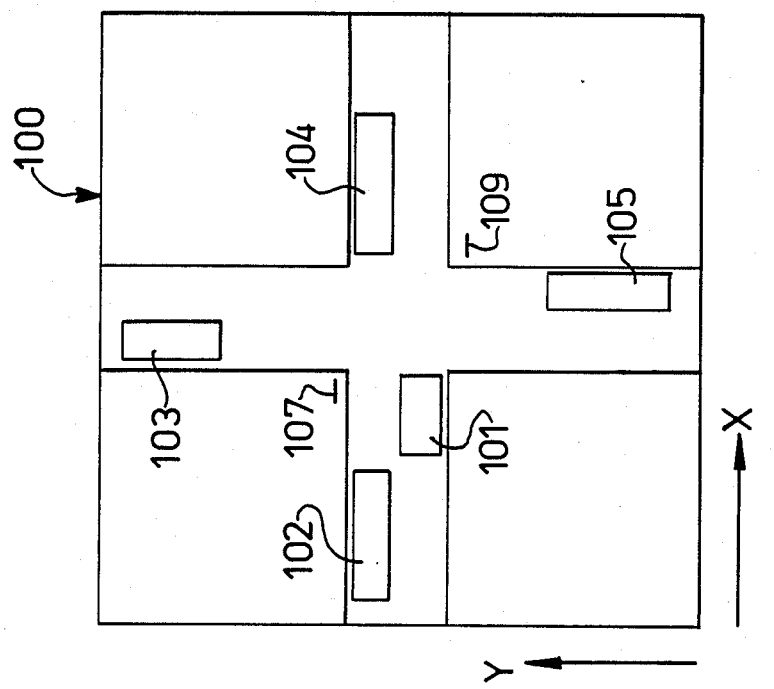
FIG. 2 illustrates the image to be processed by the pattern recognition system of the present inventions.

The steps which have been performed to this point may be more easily understood by reference to FIGS. 2 and 3 of the drawings. FIG. 2 shows the scene 100 as stored in the form of data in memory 108, before being processed by processor 110 (FIG. 1). It shows motor vehicles 101–105 and stop signs 107 and 109, as well as roads and fields.

FIG. 3 shows the result of the search for areas of scene 100 displaying abrupt height changes. Because the area shown is rolling countryside, the only objects in scene 100 which show abrupt changes are vehicles 101-105 and stop signs 107 and 109. From this point on in the processing of image 100, these are the only areas subjected to further processing. This demonstrates the benefit of performing a highly discriminatory step first in the process. Only a small fraction of the area of scene 100 need be processed further. The data defining areas 101-105, 107, and 109 are passed to filter bank 112 (FIG. 1) by processor 110, Pixel classifier 114 determines to which of the recognizable classes the data corresponding to the n signals produced by filter bank 112 may belong. Taking, for example, the signal $I_k(x,y)$ to represent the kth wavelength intensity of the pixel at location (x,y) these n values may be treated as an n-dimensional intensity vector in an n-dimensional "color" space. The axes of this space are designated $I_1, \ldots, I_n$. Either through using an earlier training set of data containing similar topography and features to be recognized, or by means of proper analysis of some of the data contained in the image taken of scene 100, the n-dimensional "color" space may be divided into volumes corresponding to the various classes which are to be recognized.

Figure 4:
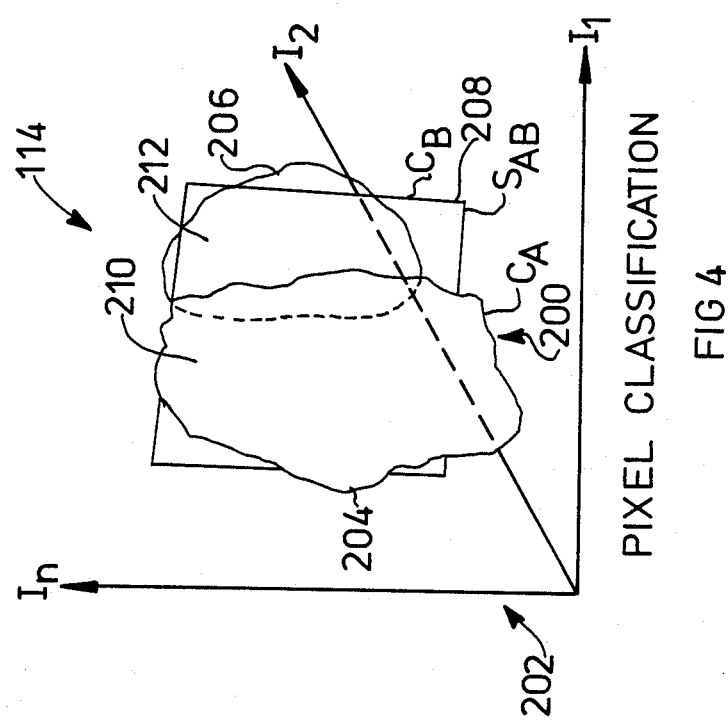
FIG. 4 shows in greater detail the pixel classifier of the present invention.

Pixel classifier 114, as shown in greater detail in FIG. 4, may be thought of as using an n-dimensional space separated into disjoint volumes by intersecting surfaces. These surfaces are defined by referring to the set of clusters, C 200, defined by the data used to train the pixel classifier. Each cluster represents a collection of points in "color" space 202 whose intensity vectors tend to group together: their data tend to come from pixels belonging to the same class. Statistical methods such as the maximum likelihood method may be used to place decision boundary surfaces in the n-dimensional space to define optimal discrimination among the clusters corresponding to various pixel classes.

Using FIG. 2 to illustrate, classes A and B are represented by the clusters $C_A$ 204 and $C_B$ 206, respectively. Assuming that $C_A$ and $C_B$ are close to one another (or even that they overlap), a decision boundary surface $S_{AB}$ 208 is defined to separate these two classes in a statistically optimal manner. According to the maximum likelihood criterion, a likelihood ratio $\Lambda(z) = p_A(z)/p_B(z)$ is defined, where $p_A(z)$ and $p_B(z)$ are the probability density functions associated with the events of point z belonging to classes A and B respectively. This likelihood ratio is compared to a threshold $\Lambda_O$ which is chosen to provide a statistically optimal separation of members of class A from those of class B. For each color space point z which is to be classified in either class A or class B, the point is classified in class A if $\Lambda(z)$ is greater than or equal to $\Lambda_O$ and in class B otherwise. Taking another view, the equation $\Lambda(z) = \Lambda_O$ may be seen to define the decision boundary surface $S_{AB}$ 208 in color space which optimally separates points associated with class A from those associated with class B.

After the decision boundary surfaces have been defined, a given intensity vector may be classified, not by reference to the clusters, but rather, by reference to the point in "color" space corresponding to the given vector and the decision boundary surfaces which surround that point.

As shown in FIG. 4, the intensity vectors corresponding to two pixels, the first at $(x_1, y_1)$ and the second at $(x_2, y_2)$, belong to different classes. The intensity vector corresponding to the first pixel is point $P_1$ 210, while the intensity vector corresponding to the second pixel is $P_2$ 212. Points $P_1$ 210 and $P_2$ 212 lie on opposite sides of the surface $S_{AB}$ 208 and therefore can be discriminated and placed in their appropriate classes.

The result of this pixel classification step is to ascribe each pixel in the original image to a particular classification. In the landscape example, if each pixel is classified according to its color, all pixels colored a particular shade of green will be classified together. The pixel classification data which are placed in classes of further interest are passed to spatial processor 120 (in FIG. 1).

In a general sense, the result of the pixel classification step is only a partial classification. It is possible that the feature to be recognized falls into classifications whose spectral definitions overlap, i.e., the spatial configurations must be considered before the classifications can be made unique. Therefore, the amount of data passed to spatial processor 120 is generally more than will ultimately be placed in classifications containing the features to be recognized. Nevertheless, this first partial classification significantly reduces the amount of data to be passed on to spatial processor 120.

As shown in FIG. 5 of the drawings, the pixel classifier has been used to give a color to every pixel inside areas 101-105, 107, and 109. The colors found are designated by letters within the rectangles defining each object. For example, object 102 is colored green ("G"), while object 105 is red ("R") and object 101 is green with an internal white ("W") area.

Figure 7:
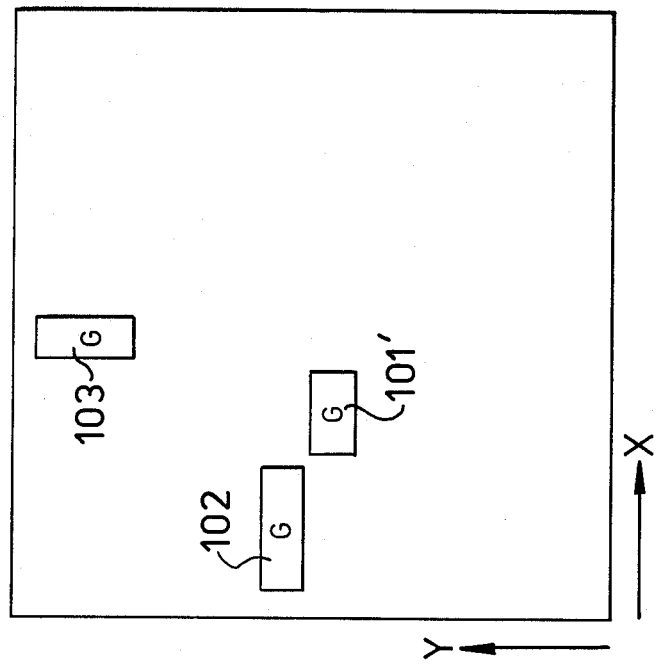
FIG. 7 illustrates the color discrimination operation of the spatial classifier of the present invention.

Spatial processor 120 interprets the spatial size and orientation of areas of the image specified by the pixel classifier 114. Specifically, since it is a pattern recognition task to locate all green sedans with white tops, in the scene 100, spatial processor 120 will first analyze only those pixels which have been classified as green, after first filling all internal voids. This step is shown in FIG. 6, where the internal white area of object 101 has been changed to green to conform with the surrounding green color. As shown in FIG. 7, it is then easy to eliminate all non-green objects, leaving only objects 101', 102, and 103. With information regarding the size range of sedans, spatial processor 120 can begin its first task—that of identifying groups of green pixels which may be automobiles.

Spatial processor 120 may be a serial neighborhood processor such as the cytocomputer developed at the Environmental Research Institute of Michigan. To identify pixel groups which satisfy the spatial requirements, the cytocomputer will erode only those regions (features) composed of pixels classed as green, and representing objects standing approximately the height of an of an automobile from the ground. Erosion will be carried out sufficiently to eliminate all features properly classified according to their multispectral data, but which are smaller than the minimal acceptable size of a sedan. A copy of this eroded scene, which contains images of all properly spectrally classified objects with a size at least that of a sedan, is stored. Another copy is further eroded to entirely remove features which may be sedans, leaving only eroded images of features larger than sedans in the original scene. This copy is then dilated to leave the features the size they were before this last erosion, and used as a mask with the previously stored eroded copy to remove all features originally larger than a sedan. Finally, this image is dilated to the original scale, leaving only regions which may represent green sedans.

If the recognition task was simply to find all green sedans, the operation would be complete, following the development of a signal which signifies the identification and location of each of the green sedans in the original image. If, however, the recognition task is to find all green sedans with white tops, the process described above must be reiterated with appropriate changes in the features to be recognized. Therefore, next the spatial processor searches for regions of white pixels satisfying the size requirements to be the top of an automobile. The search for these areas may be limited to those areas of the image which are surrounded by the correctly classified and spatially configured areas found as above.

Figure 8:
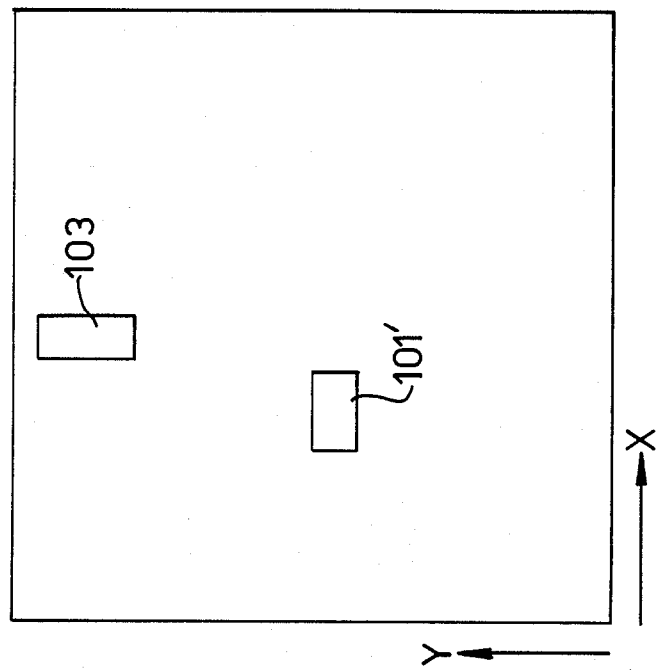
FIG. 8 illustrates the size and shape discrimination operation of the spatial classifier of the present invention.

FIG. 8 shows the result of this last step, where only objects 101' and 103 are the right size and shape. Object 102, a truck, failed because of its size and is eliminated from further consideration by spatial processor 120.

Figure 9:
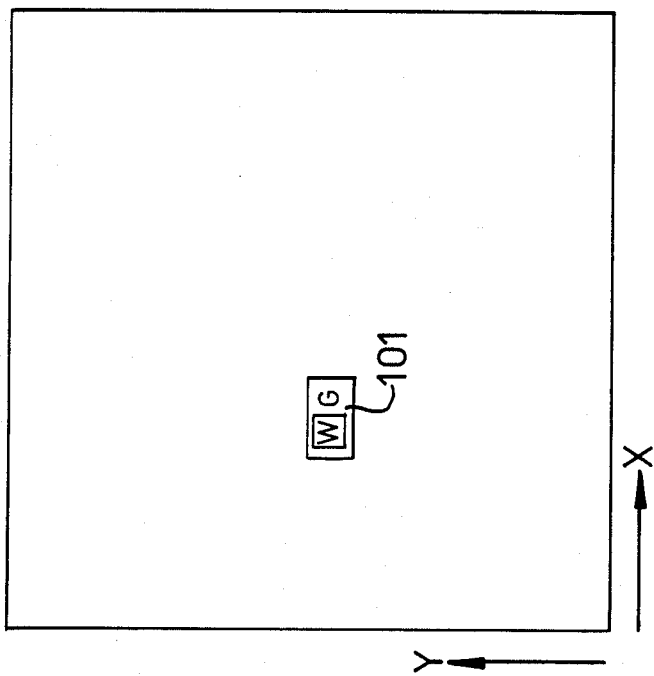
FIG. 9 presents the final result produced by the spatial classifier of the present invention.

Finally, as shown in FIG. 9, by referring back to the scene shown in FIG. 5, spatial processor 120 can perform a logical AND function to point out all regions of green pixels containing white pixels which have the proper size to be an automobile. This is object 101 in FIG. 9. The pattern of objects with these features is then said to be identified and located.

While a specific illustrative application of the invention has been chosen, it will be understood by those skilled in the art that the invention can be applied to a very wide range of pattern recognition tasks. In particular, the specific illustrative application above is to a three-dimensional problem, where the imaging sensors are capable of measuring a dimension perpendicular to the plane of the image and this dimension is used to help discriminate features of interest from the remainder of the image. Those discriminated features are the classified based on the spectral content of their radiated electromagnetic energy, and then identified based on the spatial configuration of the classified features. In this illustrative application, the particular order of steps is chosen because it minimizes the amount of data which must be processed by steps following the first discrimination.

The steps and their order of application are highly dependent upon the application. For some two-dimensional problems, it may be more efficient to perform a spatial classification before using the spectral components, while for others the spectral component classification should be done first. An example of the former is the task of recorginizing values of cylindrical resistors on a printed circuit (PC) board by reading their color bands. Very little of the projected area of a PC board is taken up by the rectangular shapes of the resistors. Therefore, to minimize the number of pixels which must be processed further, spatial processing is applied to the PC board image first. When candidate rectangles have been classified, analysis of the spectral responses within each rectangle is performed to establish the color and order of the bands. On the other hand, when the task is to recognize oranges having a precise color and certain size, the greater speed of the spectral response analysis suggests that it be done first to minimize the area to be searched for oranges of the right size.

For some three-dimensional pattern recognition tasks, the available height information should be used last in order for the procedure to be efficient, because the height information becomes valuable only after these areas have been prefiltered on the other criteria.

Further, although the illustrative embodiment also discloses the collection of the multispectral image data, the method and apparatus for pattern recognition of this invention can also be applied to collected distributions of data. These distributions can, for example, be in the form of rectangular arrays of digital data, where the shape of the array conforms to the shape of the image and the digital value at each element of the array can be encoded to contain information regarding the spectral content and third dimension of the image at the corresponding point. Such distributions may be collected at another time or place, or may result from transformations of other images of data.

It is apparent that various alternative embodiments may be set forth by those skilled in the art without departing from the spirit or scope of the following claims which are intended to encompass such alternative embodiments.

We claim:

1. A system for recognizing features in an image comprised of wavefronts of radiated energy, each point in the image being characterized by a plurality of radiated energy intensities at different predetermined wavelengths and a height, comprising:

sensor means operable to receive the radiated energy from preselected points in the two-dimensional image in a predetermined order, thereby defining picture elements, and to produce a plurality of signals measuring the radiated energy intensities and height within each picture element;

filter means for filtering the signals produced by the sensor means and adapted to produce a plurality of signals measuring the radiate energy intensity within each picture element at each of the predetermined wavelengths;

processing means adapted to receive the signals produced by the sensor means and to produce a signal measuring the height associated with each picture element;

first classification means adapted to receive at least some of the plurality of signals produced by the processing means and the filtering means, to partially classify each of the picture elements according to a first predetermined classification criterion selected from the set of classification criteria including the distribution of the plurality of radiated energy intensities within each picture element, and the distribution of the height associated with each picture element, the criterion selected being that which minimizes the number of picture elements partially classified and to produce a signal indicative of the resulting partial classification; and second classification means adapted to receive the signal indicative of the resulting partial classification produced by the first classification means, operable to further classify, according to the remaining criterion of said set of classification criteria, the picture elements partially classified by the first classification means into classes containing the features to be recognized, and to produce signals indicative of which picture elements have been further classified.

2. The apparatus of claim 1, further comprising spatial classification means adapted to receive the signals indicative of which picture elements have been further classified produced by the second classification means, to classify the picture elements classified by the second classification means according to the spatial relationships among the picture elements and to produce a signal indicative of which picture elements comprise the features to be recognized.

3. The apparatus of claim 1, further comprising identification means adapted to receive the signal indicative of which picture elements have been further classified produced by the second classification means and to produce a signal signifying the location of the picture elements which comprise the features to be recognized.

4. The apparatus of claim 3, further comprising identification means for statistically determining, from a training set of data, data defining the characterization of classes, comprising conversion means for converting the training data to a form for use with a digital computer system, adaptable to receive the converted training data and programmed to produce the data defining the characterization of each of the classes, the characterization data being descriptive of both the radiated energy intensities associated with each picture element in the image and of the spatial configuration defined by each picture element in the image and its neighboring picture elements.

5. The apparatus of claim 1, wherein the radiated energy is electromagnetic energy.

6. The apparatus of claim 1, wherein the radiated energy is acoustic energy.

7. A method for recognizing a feature in an image composed of wavefronts of radiated energy, each point in the image having a radiated energy intensity at each of a set of predetermined wavelengths and a height, the feature to be recognized characterized by predetermined spatial distribution of image points having predetermined radiated energy intensities at said predetermined wavelengths and having predetermined heights, comprising the steps of:

receiving the radiated energy from preselected points in the image in a predetermined order thereby defining picture elements and producing a plurality of signals measuring the radiated energy intensities and height within each picture element;

a first classification step of said defined picture elements partially classifying each picture element according to a first predetermined classification criterion selected from among the set of classification criteria including the predetermined spatial distribution of image points of the feature to be recognized, the predetermined radiated energy intensities at said predetermined wavelengths of the feature to be recognized and the distribution of height within the feature to be recognized, the criterion selected being that which minimizes the number of picture elements whose partial classification includes the first predetermined classification criteria, and producing a signal indicative of which picture elements have been thus partially classified;

a second classification step of receiving the signal indicative of which picture elements have been thus partially classified produced by the first classification step, and further partially classifying said partially classified picture elements according to a second predetermined classification criterion different from the first selected criterion selected from among said set of classification criteria, the second criterion selected being that which minimizes the number of picture elements whose further partial classification includes the classifications containing the features to be recognized, and producing a signal indicative of which picture elements have been thus further partially classified;

a third classification step of receiving the signal indicative of which picture elements have been further partially classified produced by the second classification step, further classifying said further partially classified picture elements according to the remaining classification criterion of said set of classification criteria different from said first and second classification criteria, and producing signals indicative of which picture elements have been further classified; and receiving the signals indicative of which picture elements have been further classified produced by the third classification step, and producing a signal identifying those picture elements as containing the feature to be recognized.

8. The method claimed in claim 7 wherein;
said first classification step includes classification based upon the height of the picture element;
said second classification step includes classification based upon the predetermined radiated energy intensities at said predetermined wavelengths of the picture elements; and
said third classifying step classifies according to the predetermined spatial distribution of image points of the feature to be recognized.

9. A method as claimed in claim 8 wherein;
said first classification step classifies picture elements based upon the height of the picture element by detecting abrupt changes in the height of adjacent picture elements.

10. A method for recognizing a feature in an image composed of a two dimensional array of points, each point in the array having a radiated energy intensity at each of a set of predetermined wavelengths and a height, the feature to be recognized characterized by a predetermined height distribution, a predetermined distribution of radiated energy intensity at each of the set of predetermined wavelengths and a predetermined spatial distribution of image points, comprising the steps of:

a first classification step for identifying each point of said image which satisfies a predetermined height distribution criteria corresponding to said predetermined height distribution of the feature to be recognized;

a second classification step for identifying each point identified in said first classification step which further satisfies a predetermined distribution of radiated energy intensity at each of the set of predetermined wavelengths criteria corresponding to said predetermined distribution of radiated energy intensity at each of the set of predetermined wavelengths of the feature to be recognized; and a third classification step for identifying each point identified in said second classification step which further satisfies a predetermined spatial distribution criteria corresponding to said predetermined spatial distribution of image points of said feature to be recognized, said points identified by said third classification step being said feature to be recognized.

11. The method claimed in claim 10, wherein;
said predetermined height distribution criteria of said first classifying step is all image points bounded by an abrupt change in height of adjacent points.

12. The method claimed in claim 10, wherein;
said predetermined distribution of radiated energy intensity at each of the set of predetermined wavelengths criteria of said second classifying step is all image points having a predetermined color.

13. The method claimed in claim 10, wherein:
said predetermined spatial distribution criteria of said third classifying step is all image points grouped together in clusters of a predetermined size.

14. A system for recognizing features comprising:
a sensor means for receiving radiated energy from preselected points in a predetermined order, thereby defining a two dimensional array of picture elements;
a filter means connected to said sensor means for filtering the received radiated energy for each picture element and producing a set of radiated intensity signals corresponding to the received radiated intensity at each of a predetermined set of wavelength bands for each picture element;
a height processing means connected to said sensor means for producing a signal indicative of the height associated with each picture element;
a first classification means connected to said height processing means for identifying each picture element within said array of picture elements which satisfies a predetermined height distribution criteria;
a second classification means connected to said filter means and said first classification means for identifying each picture element identified by said first classification means which further satisfies a predetermined radiated energy distribution at each of said set of wavelength bands criteria; and
a third classification means connected to said second classification means for identifying each picture element identified by both said first and second classification means which further satisfies a predetermined spatial distribution of picture elements, said picture elements thus identified by said third classification means being the feature to be recognized.

15. The system claimed in claim 14 wherein:
said predetermined height distribution criteria of said first classifying step is all image points bounded by an abrupt change in height of adjacent points.

16. The system claimed in claim 14, wherein:
said predetermined distribution of radiated energy intensity at each of the set of predetermined wavelengths criteria of said second classifying step is all image points having a predetermined color.

17. The system claimed in claim 14 wherein:
said predetermined spatial distribution criteria of said third classifying step is all image points grouped together in clusters of a predetermined size.

18. The system as claimed in claim 14, wherein;
said third classification means comprises a serial neighborhood processor.

* * * * *